| United States Patent [19] | [11] | 4,239,785 |
|---|---|---|
| Roth | [45] | Dec. 16, 1980 |

[54] METHOD FOR MAKING JERKY

[76] Inventor: Eldon N. Roth, 99 Madera Ct., San Ramon, Calif. 94583

[21] Appl. No.: 960,936

[22] Filed: Nov. 15, 1978

[51] Int. Cl.³ .......................... A23B 4/02; A23L 1/31
[52] U.S. Cl. ................................. 426/266; 426/646; 426/513; 426/517
[58] Field of Search ............... 426/264, 265, 297, 560, 426/641, 646, 266, 513, 517

[56] References Cited

U.S. PATENT DOCUMENTS

| 2,461,291 | 2/1949 | McKee | 426/264 X |
|---|---|---|---|
| 2,521,849 | 9/1950 | Hopkins et al. | 426/265 X |
| 3,432,311 | 3/1969 | Gruner | 426/264 |
| 3,664,849 | 5/1972 | Autry | 426/297 X |
| 4,098,095 | 7/1978 | Roth | 62/346 |

*Primary Examiner*—Robert A. Yoncoskie
*Attorney, Agent, or Firm*—Fitch, Even, Tabin, Flannery & Welsh

[57] ABSTRACT

A method and apparatus for making jerky from food products including meat such as beef wherein the materials for making the jerky are ground to a desired consistency and blended with selected curing agents or seasoning, the cured or seasoned material then being extruded onto a freezer drum and compressed upon the drum to chill or freeze the material and to form a desired thickness for the jerky upon the drum, the frozen jerky then being removed from the freezer drum, cut to desired lengths and deposited upon a conveyor for passage through a drying chamber to first thaw and then dry the jerky strips in a continuous process. The jerky may also be smoked within the drying chamber if desired and transported to a packaging station from the drying chamber.

7 Claims, 1 Drawing Figure

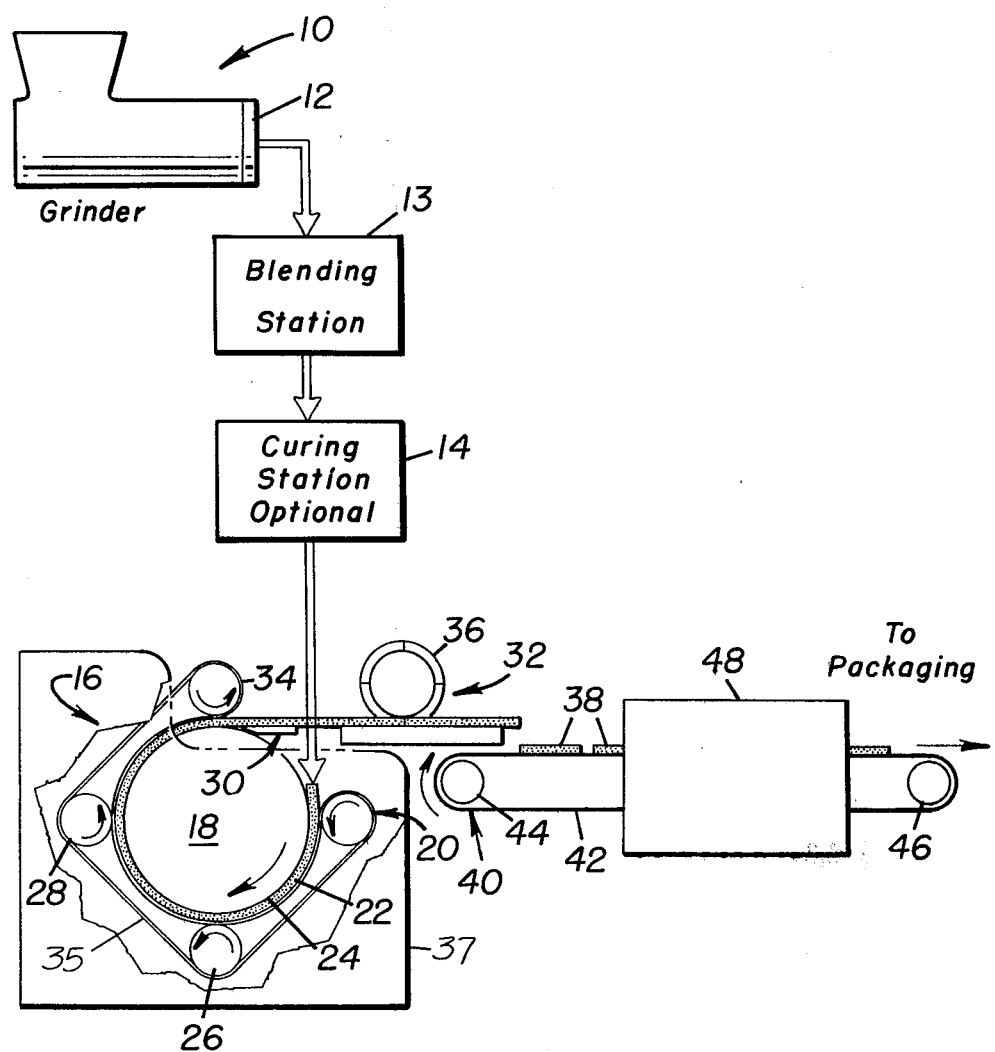

METHOD FOR MAKING JERKY

The present invention relates to a method and apparatus for making jerky and more particularly to such a method and apparatus wherein the jerky is formed in a continuous operation including a freezer drum upon which the jerky is simultaneously formed to a desired thickness and chilled or frozen within a short period of time.

In the prior art, the manufacturing of jerky from food materials, particularly meats such as beef, has been relatively time consuming, thus increasing both the processing time and final cost of the jerky. A typical process for forming jerky according to the prior art is briefly described below in order to permit a better understanding of the delay inherent in the process.

Jerky is most commonly formed from beef. However, it may also be formed from other meats such as fowl including turkey, for example, and may also include extenders such as processed soy beans and the like for supplying part of the food value in the finished jerky.

Within the process, the basic materials for forming the jerky are first ground to a selected consistency. Often, different components are ground to different degrees of coarseness in order to form a more desirable consistency in the finished product. In any event, after the jerky components are ground, they are blended with suitable curing agents or seasoning including for example, dextrose, sugar, salt, corn syrup, hydrolyzed plant protein, flavorings, sodium erythorbate, and sodium nitrite. In certain jerky compositions, it is common practice to allow the blend of ground materials and curing agents or seasonings to stand for a period of time. This may be necessary, for example, to permit the curing agents or seasonings to penetrate into the large particles resulting for example from a coarser grind.

In any event, after the components are ground and suitably cured or seasoned, the mix is then prepared in slabs having a thickness of from about one to one and one-half inches. The slabs of jerky are then deposited in a freezing chamber and allowed to remain there until the slabs are frozen or sufficiently chilled to permit them to be accurately cut into thin slices which are the usual form in which jerky is sold.

Accordingly, after the slabs of jerky are suitably chilled or frozen, they are removed from the freezer and cut into thin slices having a uniform thickness of approximately one-sixteenth to one-eigth inch for example. The thin slices of frozen jerky are then deposited upon a conveyor and carried through a drying chamber. Either before or after entry of the jerky slices into the drying chamber, they commence to thaw and, after thawing, remain in the drying chamber until sufficient moisture is removed from the slices so that they may be stored at room temperature for extended periods of time. If desired for purposes of imparting additional flavoring or for preservation of the jerky, the slices may also be smoked and the smoking may be accomplished within the drying chamber. After the jerky slices are dried, and smoked, if desired, they are removed from the drying chamber and conveyed to a suitable packaging station where the jerky is prepared for sale.

Within the prior art process for forming beef jerky as described above however, it will be apparent that substantial time was required particularly during the chilling or freezing stage. After the jerky is formed into slabs having a thickness of 1 inch or greater, substantial time is required for chilling or freezing to occur across the entire thickness of the slabs. Accordingly, because of this time delay, a substantial amount of the jerky remains in the process at any given time.

It will be apparent that the present invention is only directed toward the making of jerky which is generally termed "ground and formed" or "chunked and formed" jerky. The invention is not particularly concerned with the production of jerky from whole strips of meat, for example where the finished thickness of the jerky is established by the initial cutting of the meat.

It is also particuarly contemplated that jerky of the type referred to within the present invention preferably includes beef as a substantial component. However, as was noted above, the jerky may also be formed from other meats including fowl such as turkey for example and may even include extenders selected from vegetable material such as processed soy beans or the like. It will be obvious from the following description that the present invention is equally adaptable to the processing of jerky from any material including meat or vegetable products wherein the jerky is first ground and blended with curing agents or seasonings prior to being formed into thin strips as described above.

Accordingly, there has been found to remain a need for a method and apparatus for rapidly and continuously making jerky of a type commonly referred to as "ground and formed". That term is used within the following description in accordance with the preceding discussion of the prior art.

SUMMARY OF THE INVENTION

It is therefore an object of the invention to provide a method and apparatus for rapidly and continuously making beef jerky.

It is a more specific object of the invention to provide a method and apparatus for rapidly and continuously making "ground and formed" or "chunked and formed" jerky wherein the basic components for the jerky are first divided for example by grinding and then blended with curing agents or seasoning, the cured or seasoned materials then being simultaneously formed to a selected thickness and chilled or frozen upon a freezer drum including means for applying the jerky in a sheet of uniform thickness upon the freezer drum and additional means for compressing the jerky upon the drum to promote heat exchange with the drum and to control final thickness for the jerky.

It is also a more specific object of the invention to form the jerky from beef or from other meats as well as from combinations of meat and/or vegetable products such as processed soy beans.

It is yet another object of the invention to provide a method of forming jerky as described above wherein the jerky is heated prior to or at the time curing agents are added in order to reduce the amount of time necessary to completely cure the material. Such heating, which was impossible in the prior art as will be discussed in greater detail below, is made possible through the use of a drum freezer which can rapidly chill or freeze the jerky to stop the curing process at any selected time.

It is an even more specific object of the invention to provide a method and apparatus for making jerky wherein the materials are first prepared and then formed to a selected thickness and chilled or frozen upon a freezer drum as described immediately above, the frozen material being removed from the drum and transferred to a conveyor means for passage through a drying chamber to permit thawing, drying and smoking of the jerky if desired in a rapid and continuous process.

Additional objects and advantages of the invention are made apparent in the following description having reference to the accompanying drawing.

BRIEF DESCRIPTION OF THE DRAWING

The drawing includes a single FIGURE containing a partially schematic representation of components for continuously forming jerky in accordance with the present invention.

DESCRIPTION OF THE PREFERRED EMBODIMENT

The method and apparatus of the present invention are described below having reference to the schematic representation of the FIGURE. Essentially, the method and apparatus of the present invention relate to the continuous manufacturing of jerky wherein a blend of ground or otherwise divided meats and/or other food products blended with suitable curing agents or seasoning are simultaneously extruded to a desired thickness and chilled or frozen by means of a drum freezer. A drum freezer of the type contemplated by the present invention is specifically described and claimed in U.S. patent application Ser. No. 688,599 filed on May 21, 1976 and entitled "REFRIGERATION APPARATUS FOR VISCOUS PASTE SUBSTANCES", now U.S. Pat. No. 4,098,095. In addition, a method of rapidly chilling or freezing materials such as meat upon a drum freezer is disclosed and claimed in U.S. patent application Ser. No. 849,166 filed Nov. 7, 1977, now abandoned by the inventor of the present invention. Accordingly, both of these references are incorporated herein as though set out in full.

Referring now to the drawing, the method of making jerky includes the initial step of grinding or otherwise dividing the basic materials for the jerky to form particles of uniform or varied coarseness selected to provide a desired consistency in the final product. Normally, as noted above, the basic materials for the jerky are formed from meats, particularly beef, but may include other meats or even vegetable extenders. The grinder indicated at 10 is preferably of a type including a screw impeller (not shown) and one or more die plates 12 through which the material is extruded to control its resulting consistency.

The ground or divided material from the grinder 10 is transferred to a blending station 13 where suitable curing agents and/or seasonings are mixed with the ground meat. As noted above, typical curing agents and seasonings for jerky include, dextrose, sugar, salt, corn syrup, hydrolized plant protein, flavorings, sodium erythorbate and sodium nitrite. Smoke flavoring may also be added to the jerky along with other seasonings to impart a smoked flavor without subjecting the meat to an actual smoking process. This additive may be employed if desired in place of the actual smoking process referred to herein.

For certain types of jerky products, it is necessary or desirable to permit the blend of meats and curing agents to stand for a period of time. Accordingly, an optional curing station is provided at 14 for receiving the blended materials from the blender station 13 if desired.

Within the present invention, rapid curing may be accomplished without detracting from the finished quality of the jerky. In this regard, the present invention particularly contemplates heating the meats and curing agents either before or at the time the curing agents are added thereto. Curing of course proceeds much more rapidly at higher temperatures, for example, 120°-150° F. It was not possible or practical in the prior art to employ such high temperatures because of the substantial amount of time required to chill or freeze the meat. If the meat is allowed to cure for an excessive time, it undesirably affects quality of the finished jerky. In particular, the jerky may tend to crumble. Accordingly, an important advantage of the present invention lies in the possibility of heating the cured jerky material so that it is not necessary to allow the meat to stand for any period of time to complete the curing process. Also, in accordance with the present invention, the curing process for the meat may be interrupted as desired by applying the cured meat to the drum freezer described herein. In this connection, it may be seen that the temperature of the meat is rapidly or almost instantaneously reduced upon contact with the heat exchange surface of the drum freezer to interrupt the curing process.

Blended material from the curing station 14, or from the blender station 13 if no additional curing time is necessary, is transferred directly to the drum freezer indicated at 16.

The construction and operation of the drum freezer 16 is described in substantial detail in the above-noted references. To briefly summarize its operation, blended material from the curing station 14 or blender 13 is spread along the nip between a large refrigerated drum 18 and a feed roller 20. The feed roller spreads the material out to form a sheet 22 of uniform thickness upon a heat transfer surface 24 of the drum 18. The surface 24 of the drum is maintained at a chilled or refrigerated temperature, for example, of about 0° F. The temperature of the heat transfer surface 24 relative to the temperature of the material is selected in accordance with the second noted reference above. In particular, the heat exchange surface 24 of the drum is sufficiently lower than the temperature of the material from the curing station or blending station in order to cause the material to adhere in heat transfer relation to the drum surface 24.

Thus, the feed roller 20 for the refrigerated drum 18 serves two particularly important functions within the present invention. Initially, it applies the blended material to the surface of the drum in order to permit it to become chilled or refrigerated in order to facilitate further processing as described further below. In addition, the feed roller 20 establishes the thickness for the sheet 22 of blended material upon the refrigerated drum. As will be seen from the following description, the final thickness for the jerky is thus established upon the heat exchange surface of the refrigerated drum 18.

While the sheet of blended material 22 is upon the surface 24 of the drum, it is further compressed upon the surface 24 by additional compression rollers 26 and 28. The purpose of the additional compression rollers 26 and 28 is to insure that the blended material remains in proper heat exchange contact with the surface of the drum and also to recompress the sheet 22 in order to maintain the final thickness desired for the jerky product.

After the sheet 22 is sufficiently chilled or refrigerated upon the surface 24 of the drum, it is removed from the drum surface, for example, by means such as a blade 30 and transferred toward a cutting station 32. Another roller 34 immediately precedes the blade 30 in order to assure proper removal of the sheet 22 from the drum surface.

The drum freezer 16 is also especially equipped because of the normal consistency of the jerky. Often, jerky does not have a sufficient content of fat or other liquid in order to assure its adhesion to the heat transfer surface of the drum. Accordingly, an endless belt preferably formed from stainless steel is trained about the feed roller 20, the compression rollers 26, 28 and the removal roller 34. The stainless steel belt 35 helps to maintain the jerky in intimate heat exchange contact with the surface of the drum and also serves to maintain the uniform thickness of the jerky as established by the feed roller 20 and the compression rollers 26 and 28.

It is also contemplated that additional means may be necessary to assure proper release of the frozen or chilled sheet of jerky from the endless belt 35 as well as from the surface of the freezer drum itself. The blade 30 of course assures release of the sheet from the drum surface. A similar blade could also be employed in connection with the endless belt 35 as it is trained about the roller 34. However, the present invention preferably contemplates the use of means (not otherwise shown) for heating the surface roller 34 in order to assure release of the sheet 22 as it passes therebeneath. For this purpose, a heated fluid could be circulated through the roller 34 or an electrical resistance heater could also be used to heat the surface of the roller 34.

In order to more rapidly accomplish chilling or freezing of the jerky upon the drum 16, it is also preferably contemplated that the drum freezer be enclosed within a housing 37 within which refrigerated air is circulated to more rapidly cool the belt 35 and the jerky upon the drum. If the roller 34 is heated as described above, it is preferably disposed outside of the housing 37 so that heat from the roller 34 does not interfere with the circulation of refrigerated air within the housing.

Within the cutting station 32, cutting means 36 cuts the frozen or chilled sheet 22 of the jerky into individual strips indicated at 38 having generally uniform length and width. For example, the individual strips 38 may be approximately 1 inch wide and for example 4-6 inches long. The individual strips 38 of jerky are spread out in generally spaced apart relation upon a conveyor 40 of a type including an endless belt 42 trained about rollers 44 and 46. The conveyor 40 carries the individual jerky strips through a drying chamber 48 which may be preferably designed in the form of a tunnel to accomplish a number of different functions. Initially, the drying tunnel 48 provides means (not shown) such as a source of hot air or source of heat for thawing out the jerky strips 38. Thereafter, the drying chamber 48 serves to continue heating the jerky strips 38 in order to remove moisture therefrom and condition the jerky strips for storage at room temperature. In addition, the drying chamber 48 may include means for smoking the jerky strips if desired either to impart additional flavor to the strips or to better preserve them. Preferably, the individual jerky strips 38 are received from the cutting station 32 and carried through the entire drying chamber or tunnel 48 by the same conveyor 40.

After the dried jerky strips 38 are removed from the drying chamber 48 by the conveyor 40, they may be transported to a suitable packaging station to facilitate shipment and/or marketing.

Numerous variations will be apparent for the method and apparatus of the present invention as set forth above. For example, it has already been noted that different materials may be employed to form the jerky. Also, it has been noted that the curing station 14 is optional and may be employed only as desired, for example to further cure certain types of meat contained in the jerky. In connection with the refrigerated drum 16, the thickness of the sheet 22 and accordingly the individual jerky strips 38 may be controlled by adjusting the spacing between the rollers 20, 26 and 28 relative to the surface 24 of the refrigerated drum 18. Similarly, the cutting means 36 employed within the cutting station 32 may also be varied in order to cut the sheet 22 into any desired form of the individual strips. Finally, the drying chamber 48 may optionally include means for smoking the jerky strips as noted above.

However, it is again noted that the present invention specifically employs a refrigerated drum as indicated at 18 for both refrigerating the blended material and simultaneously forming it to have a selected thickness. The invention further contemplates continuous processing of the individual jerky strips formed upon the refrigerated drum 18 and cut into selected shapes at the cutting station 32 that continuous processing taking place within the drying chamber.

Additional variations and modifications will be apparent within the scope of the present invention in accordance with the preceding description. Accordingly, the scope of the present invention is defined only by the following appended claims.

What is claimed is:

1. In a method for manufacturing jerky, the steps comprising
    grinding or otherwise dividing selected jerky type materials to have a desired extrudable consistency,
    blending the divided materials with curing agents and seasonings selected for jerky preparation,
    providing a refrigerated rotating drum having a peripheral heat transfer surface,
    applying the blended material onto the heat transfer surface of the drum to form a uniform thickness sheet upon its heat transfer surface and maintaining the blended material in intimate contact with the heat transfer surface,
    cooling said sheet of blended material upon the heat transfer surface of the drum to form a solidified sheet suitable for cutting,
    removing said sheet of cooled, blended material from the drum and cutting it into individual jerky strips, and
    transferring the individual strips of jerky from the cutting station and transporting them through a drying chamber means for removing excess moisture from the individual jerky strips.

2. The method of claim 1 wherein the temperature of the blended material is maintained sufficiently above the temperature of the heat transfer surface on the refrigerated drum in order to promote adhesion of the sheet of blended material to the drum.

3. The method of claim 1 wherein the blended material is heated to accelerate interaction with the selected curing agents and thereby reduce time necessary for curing, the blended and cured material thereafter being applied to the heat transfer surface of the drum to terminate action of the curing agent.

4. The method of claim 1 wherein the blended material is extruded into a sheet upon the refrigerated drum by means of a feed roller forming a nip in combination with the refrigerated drum for receiving the blended material.

5. The method of claim 4 further comprising the step of training an endless belt about the feed roller and about additional roller means in order to maintain the endless belt in contact with the sheet of blended material and to maintain the blended material in intimate contact with the heat transfer surface of the drum.

6. The method of claim 1 wherein the individual jerky strips removed from the refrigerated drum and passing through the cutting station are first thawed and then dried to remove excess moisture in order to permit storage of the strips at room temperature.

7. The method of claim 1 wherein the individual strips of jerky are transferred from the cutting station and transported through the drying chamber means in a continuous operation.

* * * * *